US010573484B2

(12) United States Patent
Emaci et al.

(10) Patent No.: US 10,573,484 B2
(45) Date of Patent: Feb. 25, 2020

(54) MAGNETIC SUPPORT FOR JOURNAL BEARING OPERATION AT LOW AND ZERO SPEEDS

(71) Applicant: General Electric Company, Schenectady, NY (US)

(72) Inventors: Edward Emaci, Milwaukee, WI (US); Ian Strider Hunt, Milwaukee, WI (US); Alexander Ryan, Milwaukee, WI (US); Michael Gorrilla, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 15/689,326

(22) Filed: Aug. 29, 2017

(65) Prior Publication Data

US 2019/0066964 A1 Feb. 28, 2019

(51) Int. Cl.
| | |
|---|---|
| *H01J 35/10* | (2006.01) |
| *H01J 35/06* | (2006.01) |
| *F16C 17/06* | (2006.01) |
| *F16C 35/02* | (2006.01) |
| *F16C 23/04* | (2006.01) |
| *F16C 39/06* | (2006.01) |

(52) U.S. Cl.
CPC ............ *H01J 35/103* (2013.01); *F16C 17/06* (2013.01); *F16C 23/04* (2013.01); *F16C 35/02* (2013.01); *F16C 39/06* (2013.01); *H01J 35/06* (2013.01); *H01J 35/104* (2019.05); *F16C 2370/00* (2013.01); *F16C 2380/16* (2013.01); *H01J 2235/1073* (2013.01)

(58) Field of Classification Search
CPC ...... F16C 17/06; F16C 2370/00; F16C 35/02; H01J 2235/1073; H01J 35/06; H01J 35/103
See application file for complete search history.

(56) References Cited

U.S. PATENT DOCUMENTS

2010/0322383 A1* 12/2010 Coon .................... H01J 35/103
378/127

OTHER PUBLICATIONS

Hirani et al., "Hybrid (hydrodynamic + permanent magnetic) journal bearings", Proc. IMechE, vol. 221, Fart J: J. Engineering Tribology, 2007, 12 pages.

(Continued)

*Primary Examiner* — Mark R Gaworecki
(74) *Attorney, Agent, or Firm* — Boyle Fredrickson, S.C.

(57) ABSTRACT

A structure and method of operation of a journal bearing is disclosed that minimizes contact of the shaft with the sleeve during start up and slow down of rotation of the shaft relative to the sleeve, or vice versa. The bearing assembly includes a gravitational load reduction mechanism with magnets disposed on the sleeve and on the shaft in alignment with one another. The magnet(s) on the shaft interacts with the magnet(s) disposed on the sleeve to provide a force against the pressure of the shaft towards the sleeve generated by gravity on the rotating component. The magnets enable centering of the rotating component within the stationary component during low rotation and non-rotation. This prevents rubbing of the rotating journal bearing component surfaces, e.g., sleeve, against the stationary journal bearing component, e.g., shaft, during assembly, ramp-up, and coast-down when the journal bearing fluid provides minimal or no bearing centering capability.

17 Claims, 7 Drawing Sheets

(56) References Cited

OTHER PUBLICATIONS

F.T. Backers, "A Magnetic Journal Bearing", Philips Technical Review, vol. 22, 1960/61, No. 7, 7 pages.

* cited by examiner

MAGNETIC SUPPORT FOR JOURNAL BEARING OPERATION AT LOW AND ZERO SPEEDS

BACKGROUND OF THE INVENTION

The invention relates generally to X-ray tubes, and more particularly to structures and methods of assembly of a journal bearing increasingly used in x-ray tubes.

X-ray systems may include an x-ray tube, a detector, and a support structure for the x-ray tube and the detector. In operation, an imaging table, on which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause variances in the attenuation of the radiation received at the detector. The detector then emits data received, and the system translates the radiation variances into an image, which may be used to evaluate the internal structure of the object. The object may include, but is not limited to, a patient in a medical imaging procedure and an inanimate object as in, for instance, a package in an x-ray scanner or computed tomography (CT) package scanner.

X-ray tubes include a cathode and an anode located within a high-vacuum environment. The anode structure is typically supported by one or more bearing members, such as ball bearings, and is rotated for the purpose of distributing the heat generated at a focal spot. Typically, an induction motor is employed to rotate the anode, the induction motor having a cylindrical rotor built into a cantilevered axle that supports a disc-shaped anode target and an iron stator structure with copper windings that surrounds an elongated neck of the x-ray tube. The rotor of the rotating anode assembly is driven by the stator. An x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed. Also, because the gantry assembly that includes the x-ray tube must spin with high rotational speed around a patient to provide good image quality, centripetal loads are high on the bearing assembly. This places stringent demands on the bearings and the material forming the anode structure, i.e., the anode target and the shaft supporting the target.

As ball bearings create issues with regard to wear and shorter useful lives for the bearing structure than is desired, in other constructions, a journal bearing, such as a liquid metal hydrodynamic bearing may be employed in lieu of ball bearings. In an x-ray tube journal bearing, the sleeve rotates relative to the shaft without any other moving parts in the bearing structure. To reduce wear between the shaft and the sleeve, a fluid, such as a liquid metal, is placed within the sleeve to lubricate the adjacent surfaces of the shaft and the sleeve, thereby limiting wear of the journal bearing assembly when in use. Advantages of liquid metal bearings include a high load capability and a high heat transfer capability due to an increased amount of contact area as compared to a ball bearing. Advantages also include low acoustic noise operation as is commonly understood in the art. Gallium, indium, or tin alloys are typically used as the liquid metal, as they tend to be liquid at room temperature and have adequately low vapor pressure, at operating temperatures, to meet the rigorous high vacuum requirements of an x-ray tube.

However, journal bearings also have certain shortcomings regarding their incorporation within x-ray tubes. In particular, in static or low speed journal bearing operation, the bearing fluid does not provide sufficient pressure between mating bearing parts to keep them from contacting. So, during coast-down, ramp-up, and assembly, there is significant possibility of rubbing between the mating inner and outer components of the sleeve and shaft forming the journal bearing. To limit the occurrences of wear as a result of this, the x-ray tube is operated in a manner that minimizes the number of ramp ups and coast or slow-downs that are performed, such that the bearing is nearly continuously operating. Continuous operation is ideal for the bearing but requires the system to stay on wasting energy and unnecessarily wearing out other system components.

As a result, it is desirable to develop a structure and method of operation for an x-ray tube journal bearing that can limit the contact of the shaft with the sleeve of the bearing during low sleeve rotational speeds, thus increasing the useful life of the journal bearing structure.

BRIEF DESCRIPTION OF THE INVENTION

In the present invention a structure and associated method of operation of a journal bearing is disclosed that minimizes contact or rubbing between the shaft and sleeve during initial start up and slow down of the rotation of the sleeve relative to the shaft, or vice versa. The bearing assembly includes a gravitational load reduction mechanism with magnets disposed on at least one of the sleeve and/or the shaft and in alignment with one another or with another portion of the bearing assembly for the magnets to interact with to reduce the gravitational load on the rotation component. The magnet on the rotating sleeve interacts with the magnet disposed on the shaft to provide a force against the pressure of the sleeve towards the shaft as generated by gravity acting on the rotating component. The magnets employed in the journal-type bearings, including liquid metal bearings (LMB) in a vacuum and/or non-vacuum environment, can be permanent magnets (passive) or electromagnets (active) that enable centering of the sleeve within the journal shaft during low rotation and non-rotation of the sleeve about the shaft. This prevents rubbing of the rotating journal bearing component, e.g., the sleeve, against the stationary journal bearing component, e.g., the shaft, during assembly, ramp-up, and coast-down when the journal bearing fluid provides minimal or no bearing load capability.

According to another aspect of an exemplary embodiment of the invention, the magnets are not required to be present around the entire circumference of the shaft and/or the sleeve for proper operation of the journal bearing. As the magnets only provide the primary shaft centering function during ramp-up and coast-down of the bearing assembly, the centering force applied between the shaft and the sleeve need only act in a single direction, i.e., against the force of gravity pulling the shaft towards the sleeve. Therefore, the magnets only need to be positioned on the shaft and/or sleeve in a location(s) where the magnet(s) can counteract the force of gravity on the shaft until the rotational speed of the sleeve creates sufficient pressure on the bearing fluid to enable the bearing fluid to provide sufficient centering forces between the shaft and the sleeve the center the shaft within the sleeve.

According to another aspect of the invention, a gravitational load reducing mechanism for an x-ray tube bearing assembly includes at least one magnet disposed on one of a rotating component of the bearing assembly or a stationary component of the bearing assembly, wherein the at least one magnet is configured to create a magnetic force in conjunction with another portion of the bearing assembly to reduce the gravitational load of the rotating component relative to the stationary component.

According to still a further aspect of the invention, a method for maintaining the position of a rotating component relative to a stationary component in a journal assembly of an x-ray tube includes the steps of placing a first magnet on the rotating component; placing a second magnet on the stationary component, the second magnet spaced from the first magnet to create a magnetic force in conjunction with the first magnet and rotating the rotating component relative to the stationary component at low speed to counteract a gravitational or other inertial force acting on the rotating member with the magnetic force.

According to still another aspect of the invention, an x-ray tube includes a frame, a cathode assembly disposed in the enclosure and an anode assembly disposed in the enclosure spaced from the cathode assembly, wherein the anode assembly has a rotating component having a first magnet thereon and a stationary component having a second magnet thereon, the second magnet spaced from the first magnet to create a magnetic force in conjunction with the first magnet to maintain a position of the rotating component relative to the stationary component against a gravitational load on the rotating component.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE INVENTION

Figure 1:
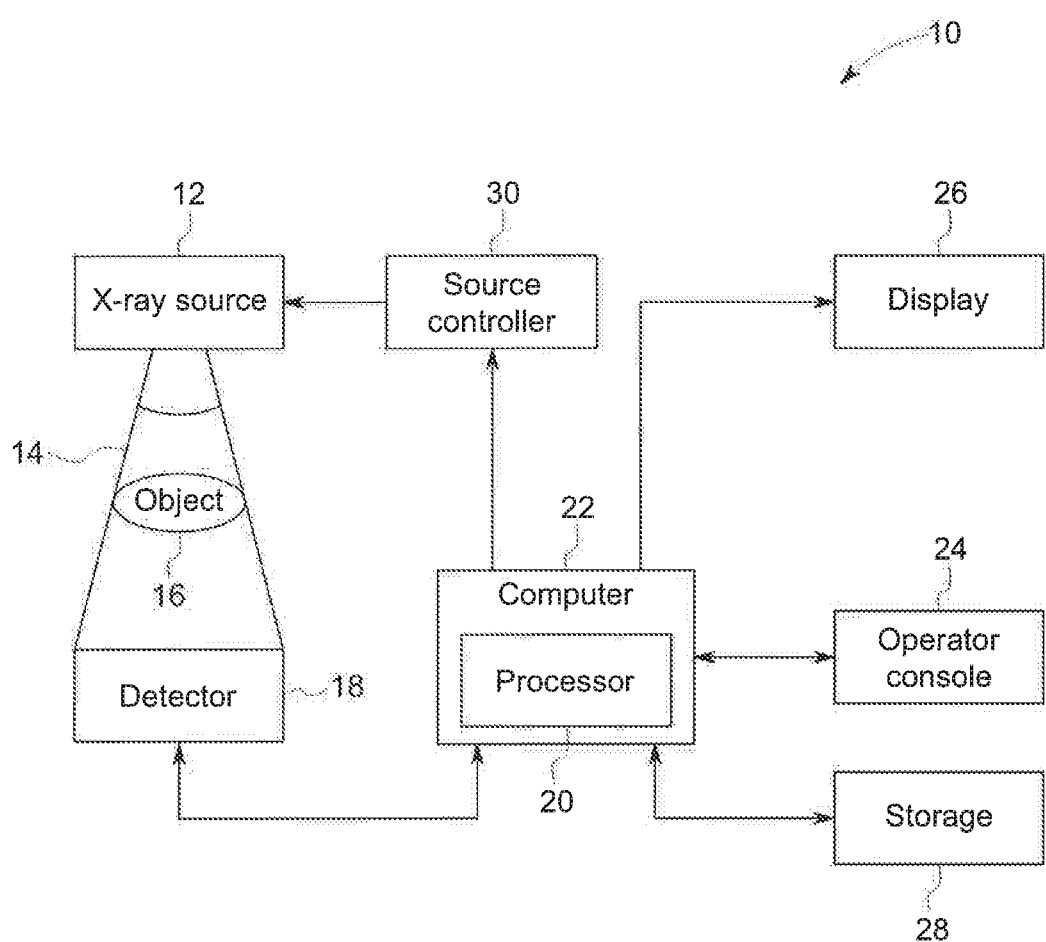
FIG. 1 is a block diagram of an imaging system incorporating exemplary embodiments of the invention.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 1, imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays 14 having a spectrum of energies that range, typically, from thirty (30) keV to two hundred (200) keV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 16. In one embodiment, detector assembly 18 is a scintillation based detector assembly, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a source controller 30 that provides power and timing signals to x-ray source 12.

Figure 2:
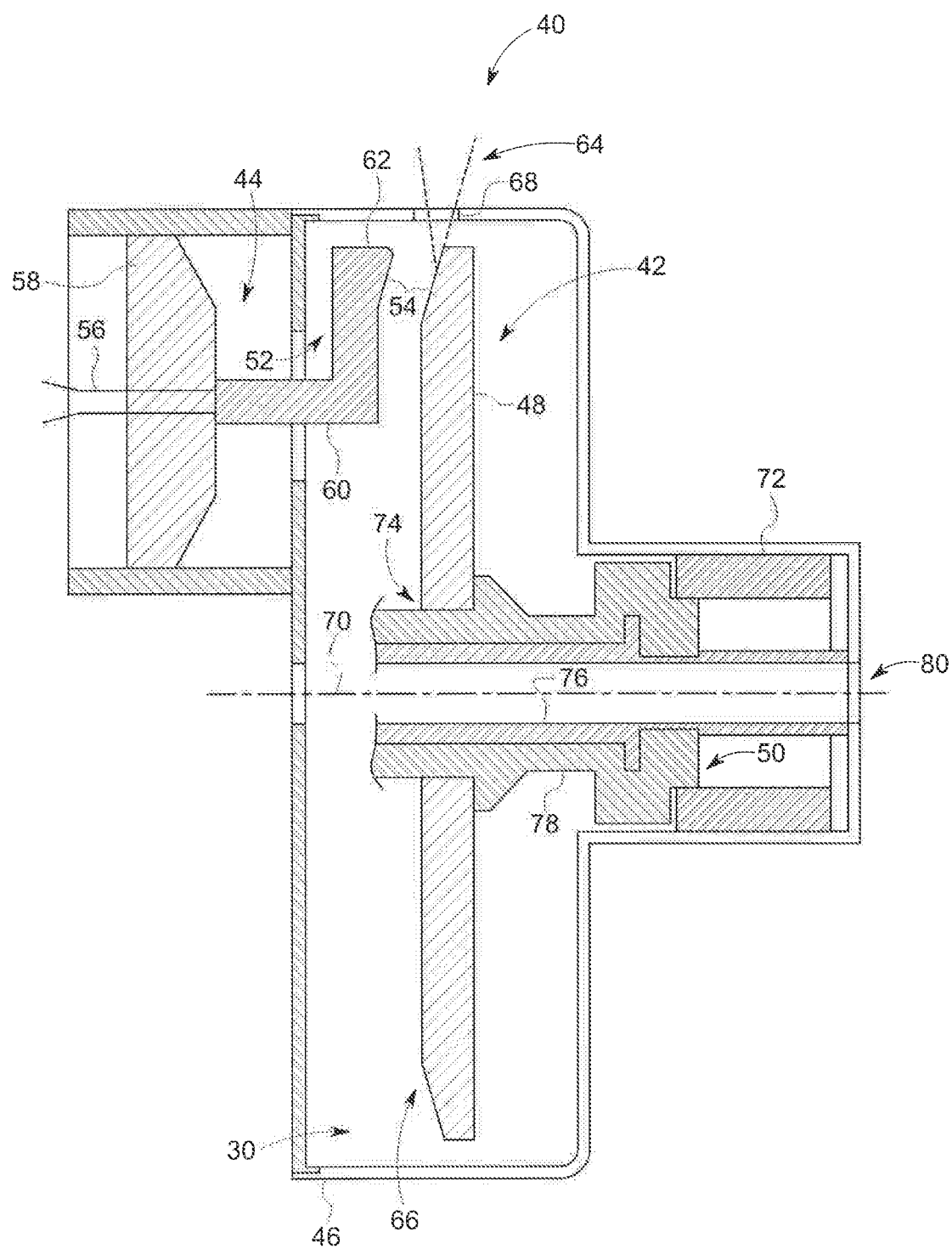
FIG. 2 is a cross-sectional view of a portion of an x-ray tube according to an exemplary embodiment of the invention and usable with the system illustrated in FIG. 1.

FIG. 2 illustrates a cross-sectional view of an x-ray source 12 incorporating embodiments of the invention. In the illustrated embodiment, x-ray source 12 is formed of an x-ray tube 40 that includes an anode assembly 42 and a cathode assembly 44. X-ray tube 40 is supported by the anode and cathode assemblies 42, 44 within an envelope or frame 46, which houses a target or anode 48, a bearing assembly 50, and a cathode 52. Frame 46 defines an area of relatively low pressure (e.g., a vacuum) 30 compared to ambient, in which high voltages may be present. Frame 46 may be positioned within a casing (not shown) filled with a cooling medium, such as oil, that may also provide high voltage insulation. While the target and anode are described above as being a common component of x-ray tube 40, the target and anode may be separate components in alternative x-ray tube embodiments.

In operation, an electron beam 54 is produced by cathode assembly 44. In particular, cathode 52 receives one or more electrical signals via a series of electrical leads 56. The electrical signals may be timing/control signals that cause cathode 52 to emit electron beam 54 at one or more energies and at one or more frequencies. The electrical signals may also at least partially control the potential between cathode 52 and anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a thermionic filament within cathode cup 62 to form electron beam 54.

X-rays 64 are produced when high-speed electrons of electron beam 54 are suddenly decelerated when directed from the cathode 52 to a target or focal surface 66 formed on target 48 via a potential difference therebetween of, for example, sixty (60) thousand volts or more in the case of CT applications. The x-rays 64 are emitted through a radiation emission passage 68 formed in frame 46 toward a detector array, such as detector 18 of FIG. 1.

Anode assembly 42 includes a rotor 72 and a stator (not shown) located outside x-ray source 40 and surrounding rotor 72 for causing rotation of anode 48 during operation. Target 48 is supported in rotation by a bearing assembly 50, which, when rotated, also causes target 48 to rotate about the centerline 70. As shown, target 48 has an annular shape, which contains a circular opening 74 in the center thereof for receiving bearing assembly 50.

Target 48 may be manufactured to include a number of metals or alloys, such as tungsten, molybdenum, copper, or any material that contributes to Bremsstrahlung (i.e., deceleration radiation) when bombarded with electrodes. Target or focal surface 66 of target 48 may be selected to have a relatively high refractory value so as to withstand the heat generated by electrons impacting target 48. Further, the space between cathode assembly 44 and target 48 may be evacuated in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of target 48 within x-ray tube volume 46, in a CT application, the x-ray source 40 as a whole is caused to rotate about an object, such as object 16 of imaging system 10 in FIG. 1, at rates of typically 1 Hz or faster.

Bearing assembly 50 can be formed as necessary, such with a number of suitable ball bearings (not shown), but in the illustrated exemplary embodiment comprises a liquid metal hydrodynamic bearing having adequate load-bearing capability and acceptable acoustic noise levels for operation within imaging system 10 of FIG. 1.

In general, bearing assembly 50 includes a stationary component, such as center shaft 76, and a rotating portion, such as sleeve 78 to which the target 48 is attached. While center shaft 76 is described with respect to FIG. 2 as the stationary component of bearing assembly 50 and sleeve 78 is described as the rotating component of bearing assembly 50, embodiments of the present invention are also applicable to embodiments wherein center shaft 76 is a rotary shaft and sleeve 78 is a stationary component. In such a configuration, target 48 would rotate as center shaft 76 rotates.

Center shaft 76 may optionally include a cavity or coolant flow path 80 though which a coolant 82 (FIG. 3), such as oil, may flow to cool bearing assembly 50. As such, coolant 82 enables heat generated from target 48 of x-ray source 40 (FIG. 2) to be extracted therefrom and transferred external from x-ray source 40. In straddle mounted x-ray tube configurations, coolant flow path 80 extends along a longitudinal length of x-ray source 40. In alternative embodiments, coolant flow path 80 may extend through only a portion of x-ray source 40, such as in configurations where x-ray source 40 is cantilevered when placed in an imaging system.

Figure 3:
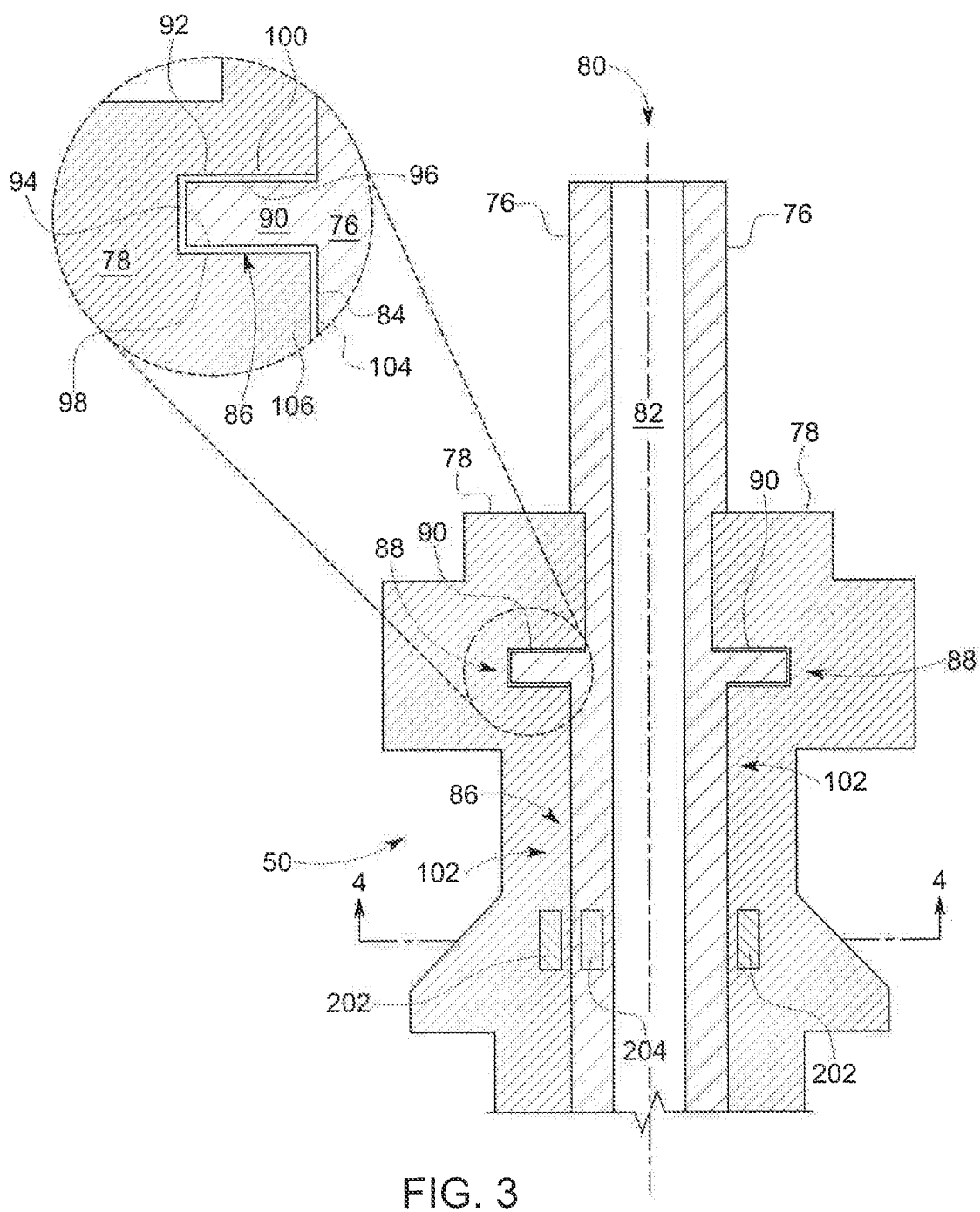
FIG. 3 is a schematic view of a journal bearing for an x-ray tube with a gravitational load reducing mechanism in accordance with an exemplary embodiment of the invention.

Referring now to FIG. 3, a cross-sectional view of a portion of bearing assembly 50 is shown according to an embodiment of the invention. Bearing assembly 50 includes a center shaft 76 positioned within sleeve 78, which is configured to support an anode (not shown), such as target 48 of FIG. 2. A lubricant 84 is positioned in a gap 86 formed between center shaft 76 and sleeve 78. In embodiments of the invention, lubricant 84 is a metal or metallic alloy that exists in a liquid state at operating temperature of bearing assembly 50.

The lubricating fluid 84 flowing between the rotating and stationary components of the bearing assembly 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the x-ray tube may be used. In the present context, low vapor pressures may generally be in the range of $1 \times 10^{-5}$ Torr. In other words, fluids that are stable in vacuums are desirable for use in x-ray tube systems so as to not adversely affect the established vacuum during operation of the system. In the present disclosure, lubricant 84 may be gallium or a gallium alloy as non-limiting examples.

Exemplary base materials of center shaft 76 and sleeve 78 of bearing assembly 50 include ceramics, metals, and combinations thereof. In one embodiment, center shaft 76 and sleeve 78 are constructed of the same base material. Alternatively, the base materials of center shaft 76 and sleeve 78 may differ.

In the embodiment illustrated in FIG. 3, center shaft 76 of bearing assembly 50 is a stationary component and sleeve 78 is a rotatable component constructed to rotate about center shaft 76. However, one skilled in the art will recognize the inventive concepts described herein are applicable to alternative bearing configurations. As one example, bearing assembly 50 may instead include a stationary outer component and a rotating center shaft having a target attached thereto. As another example, bearing assembly 50 may be a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, this invention is applicable to any bearing configuration having a rotatable component and a stationary component, and a liquid lubricant therebetween, regardless of configuration or application.

As illustrated in FIG. 3, center shaft 76 of bearing assembly 50 includes a thrust bearing portion 88 comprising a radial projection 90 that extends from center shaft 76 and is positioned in a radial cavity 92 of sleeve 78. Radial projection 90 of thrust bearing portion 88 includes a pair of outer bearing surfaces 94, 96 that face inner bearing surfaces 98, 100 of sleeve 78. In cantilever mount embodiments, sleeve 78 may also include a removable endcap (not shown) to allow assembly of components. Radial projection 90 limits axial motion of sleeve 78 relative to center shaft 76, and, as illustrated, lubricant 84 is also included between radial projection 90 and sleeve 78. Radial projection 90 need not be limited in axial length, but may be extended in axial length to provide additional mechanical support of components.

A radial or journal bearing portion 102 of bearing assembly 50 is located adjacent thrust bearing portion 88. An inner surface 104 of journal bearing portion 102 of center shaft 76 faces an outer surface 106 of journal bearing portion 102 of sleeve 78. While journal bearing portion 102 is illustrated on a first side of thrust bearing portion 88 adjacent outer race surface 94, one skilled in the art will recognize that bearing assembly 50 may include a second journal bearing portion located on a second side of thrust bearing portion 88 adjacent inner race surface 96. Various coatings, textures, and patterns including grooves embedded in the contacting surfaces of bearing assembly 50 may be applied to alter bearing behavior as the shaft 76 and sleeve 78 rotate relative to each other.

Bearing assembly 50 may be referred to as a spiral groove bearing (SGB) due to the patterning of grooves along the various surfaces of the bearing. In some examples, the spiral groove may be formed from a logarithmic spiral shape. The spiral groove bearing may also be equivalently referred to as a hydrodynamic bearing or liquid bearing. In such spiral groove bearings, ways to contain the liquid lubricant 84 may be categorized in two general methods. The first includes providing physical barriers near the ends of the bearing where shaft seals would be placed in other applications. Rubber or other types of shaft seals in the presence of the vacuum inside the x-ray tube may function improperly, degrade quickly, and/or destroy the pressure inside the x-ray tube. For similar reasons, o-rings, grease, or other conventional means for aiding in rotational lubrication between two components may be undesirable because of the vacuum in the x-ray lube. Greases and other lubricants with lower vapor pressure than liquid metals may vaporize and destroy the vacuum. In some examples, physical walls of different shapes and sizes may be placed at different angles to capture the lubricant to reduce leakage through the bearing.

The second general method includes utilizing the capillary forces of the lubricant, wherein the small gap between two opposing bearing surfaces wets the fluid to retain the fluid within the gap. In other words, the anti-wetting properties of the surface (via texturing, coating, or both) aids in preventing the lubricant from flowing in between the small gaps. In some examples, the surfaces are coated and/or textured to be more wetted such that the lubricant clings via adhesion in the small gap to reduce lubricant moving through the gap. In other examples, the surfaces are coated and/or textured to be more anti-wetting such that the lubricant is pushed away from the small gaps near the ends of the bearing assembly. In this context, the small gap may be in the range of 50 microns.

Operation of liquid bearings in x-ray tube systems, such as bearing assembly 50 of FIGS. 2 and 3, may be at least partially dependent on a tradeoff between load carrying capacity and fluid pumping force. In some examples, the load carrying capacity and fluid pumping force are inversely proportional and directly related to geometry of the bearing grooves. For example, given a substantially constant rotational speed of the liquid bearing, deeper grooves may provide a higher pumping force, while the increased clearance between the shaft and sleeve can reduce the load carrying ability of the bearing. Pumping force may be utilized to contain the lubrication fluid and anti-wetting coatings may be applied to sealing surfaces to further assist in containing the lubrication fluid.

Due to the relative motion of the sleeve and shaft, the lubricating fluid is moved in a number of ways, including but not limited to, shearing, wedging, and squeezing, thereby creating pressures to lift and separate the shaft and sleeve from each other. This effect enables the liquid bearing to function and provide low-friction movement between the shaft and sleeve. In other words, shearing of the lubricating fluid imparts energy into the fluid which causes the fluid to pump, wherein the pumping action into the gap between the shaft and sleeve is how the liquid bearing functions. Energy transfer from the surfaces to the fluid enables bearing functionality. In application, in the context of the x-ray tube, wetting between some bearing surfaces and the lubricating fluid allows shearing to impact energy to the fluid. However, anti-wetting between some bearing surfaces and the lubricating fluid allows friction between the bearing surfaces to be reduced, thereby reducing operating temperatures of the bearing assembly.

Figure 4:
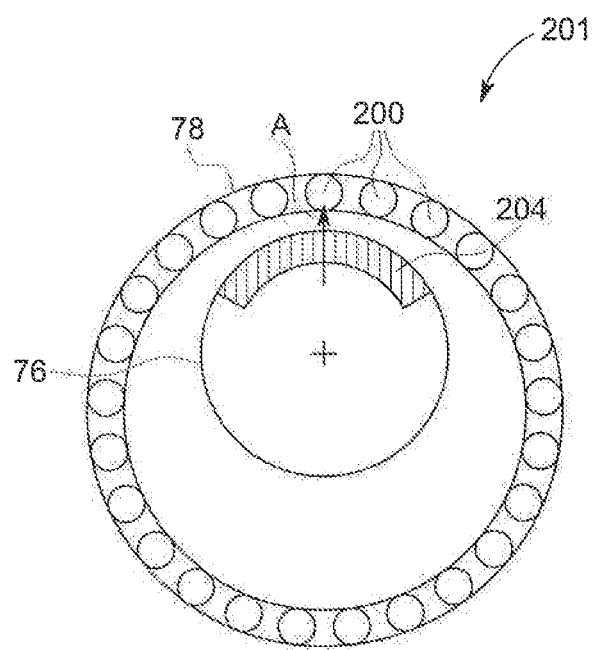
FIG. 4 is a cross-sectional view along line 4-4 of FIG. 3.

Looking now at FIGS. 3 and 4, in an exemplary embodiment of the invention the sleeve 78 includes a load reduction mechanism/magnetic bearing assembly 201 including a number of magnets 200 located on or within the material forming the sleeve 78 at one or more specified portions 202 of the sleeve 78. These portions 202 generally correspond to the locations where the shaft 76 would most frequently rub against the sleeve 78 when fluid pressure from the lubricant 84 is insufficient to overcome the force of gravity acting on the sleeve 78 relative to the shaft 76. The magnets 200 are located within the sleeve 78 around the circumference of the sleeve 78 in order to provide a magnetic force at each point around the sleeve 78 at the specified portion(s) 202. In an alternative exemplary embodiment of the invention, while the magnets 202 are illustrated in FIG. 3 as discrete magnetic elements, the magnet 202 could also be a single annular magnet (not shown) disposed on or within the sleeve 78 and engineered to have equivalent properties and same functionality as the individual magnets 202

To interact with the magnets 200 in the sleeve 78, the bearing assembly 50 includes a separate positioning magnet (s) 204 disposed adjacent to an in alignment with the portion 202 of the sleeve 78. The positioning magnet 204 can be disposed at any suitable location relative to the portion 202 such that a magnetic field generated by the positioning magnet 204 can interact to the magnetic field created by each of the magnets 200 disposed within the portion 202.

The magnets 200 and/or 204 can be permanent magnets (passive) or electromagnets (active) that act with repulsive or attractive force toward each other. These forces help the sleeve 78 to be centered around the shaft 76 to provide a net force which counteracts or reduces the gravitational force of the rotating components at 1 G, thereby preventing rubbing of the shaft 76 and sleeve 78 against one another at low rotational speeds where the pressure of the lubricant 84 is insufficient to provide the necessary force on the sleeve 78 to maintain the desired clearance or tolerance for the gap 86, which in an exemplary embodiment is between 20 μm and 100 μm.

In the exemplary embodiment of FIGS. 3 and 4, the positioning magnet 204 is disposed within the shaft 76 such that the magnetic forces generated by the magnets 200 and the positioning magnet 204 operate to provide a force on the sleeve 78 in the direction of arrow A in FIG. 4 as a result of the repulsive force exerted between the magnets 202 and the positioning magnet 204. Due to the placement of the magnets 202 around the entire circumference of the sleeve 78, this repulsive force continually acts on the sleeve 78 as it rotates around the shaft 76, which at low speeds this prevents rubbing between the shaft 76 and the sleeve 78. However, unlike prior art bearing assemblies, such as those disclosed in U.S. Pat. No. 3,663,075 and related references, the positioning magnet 204 is not positioned around the entire circumference of the shaft 76, but is disposed over only a portion of the shaft 76, which in an exemplary embodiment is less than or equal to 50% of the circumference of the shaft 76. This is a significant difference in the structure of prior art bearings and the bearing assembly 50, as it enables the bearing assembly 50 to be operated in a much more simple manner, and the magnetic forces need only counteract or reduce the force of gravity on the sleeve 78, and not to additionally counteract the effects of the magnetic fields acting on all surfaces of the sleeve 78 as in the prior art where the positioning magnets are required to encircle the shaft 76. Further, as the load to be affected by the magnets 202, 204 is small, i.e., the load is only the force necessary for reducing or counteracting, at least partially, the gravitational force on the sleeve 78 at 1 G, the correction of this force using the magnets 202, 204 does not require precise monitoring and associated balancing during the operation of the bearing assembly 50, as the forces provided by the lubricant 84 quickly overcome the magnetic forces from the magnets 202, 204 at higher operational speeds, e.g., above 10 Hz, or outside of 2 Hz-4 Hz, negating any further effects of the magnets 202, 204 on the sleeve 78 relative to the shaft 76.

Figure 5:
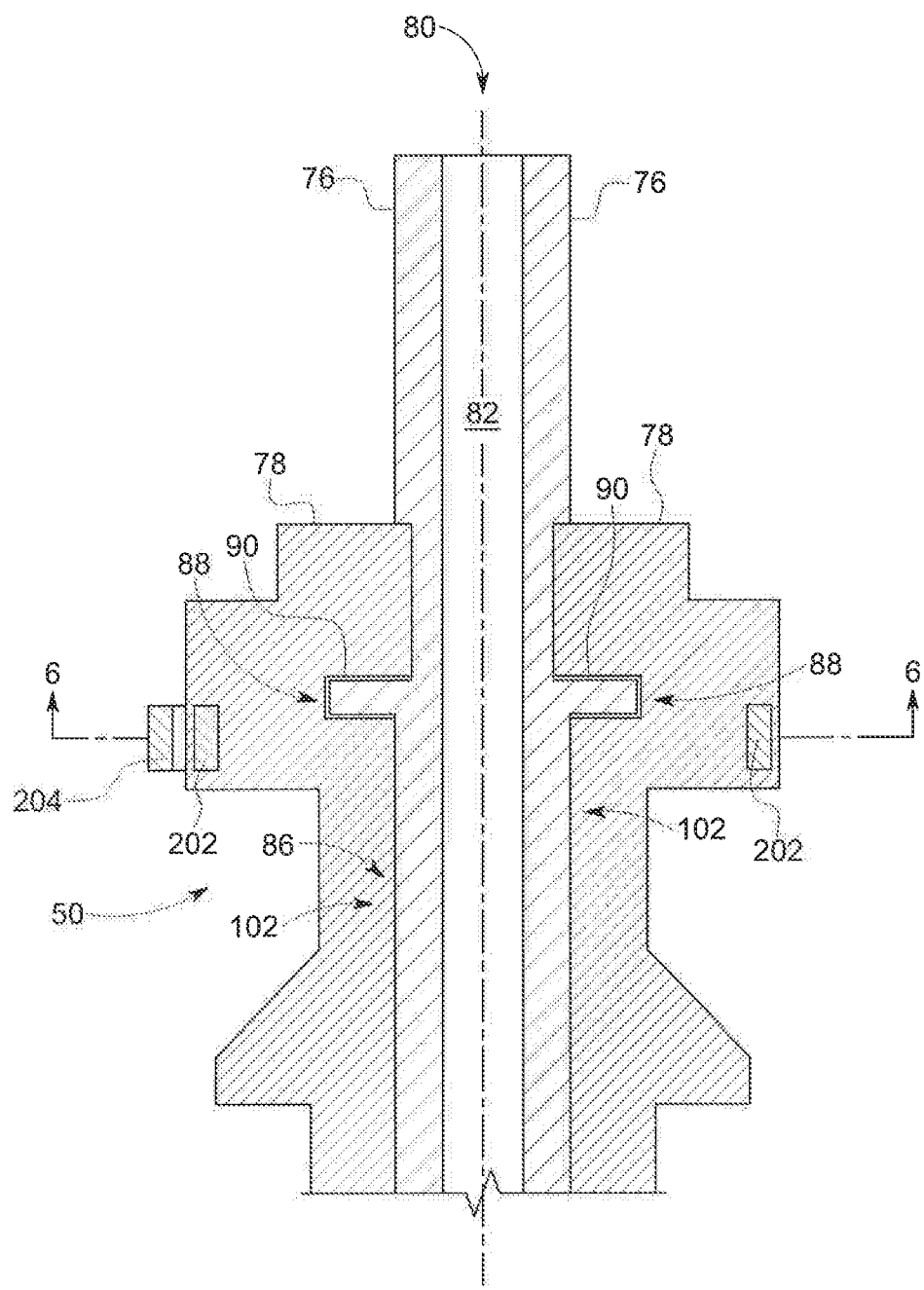
FIG. 5 is a schematic view of a journal bearing for an x-ray tube with a gravitational load reducing mechanism in accordance with a further exemplary embodiment of the invention.
Figure 6:
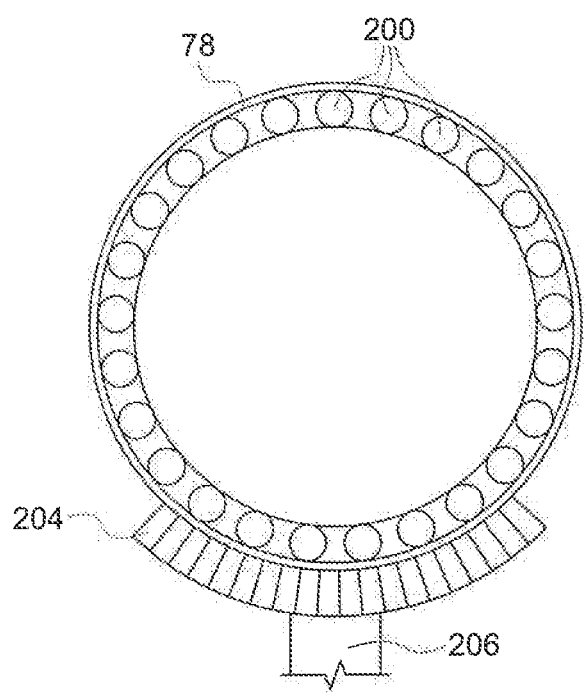
FIG. 6 is a cross-sectional view along line 6-6 of FIG. 5.

Referring now to FIG. 5, in another illustrated exemplary embodiment of the invention, instead of being disposed within the shaft 76, the positioning magnet(s) 204 can be located external to but adjacent the sleeve 78 of the bearing assembly 50 to interact with magnets 202 on the sleeve 78. In this illustrated exemplary embodiment, the positioning magnets 204 can be disposed on a support structure 206 to hold the magnets 204 adjacent the sleeve 78.

In various alternative exemplary embodiments, the magnets 202 and/or 204 can be actively controlled in order to adjust the the magnetic forces between the magnets 202, 204 as desired and to provide an indication to the operator of the system 10 of the operational status of the magnetic bearing assembly 201. In addition to any electrical control of the magnets 202, 204, the stationary magnets 202 or 204 can be positionally adjusted relative to the rotating magnets 202 or 204 during operation of the bearing assembly 50 in order to provide the desired load reduction on the gravitational force acting on the rotating component 76 or 78.

In still other exemplary embodiments, the magnets 202 and/or 204 can be formed integrally or directly with or as part of the sleeve 78 and/or shaft 76, or other component of the bearing assembly 50, of a material capable of interacting with a magnetic field. Further, in addition to the forces acting between the magnets 202, 204 being repulsive forces, in another exemplary embodiment the magnets 202, 204 can be configured and/or operated to provide and attraction force to counteract or reduce the load of the gravitational force acting on the sleeve 78 at 1 G.

Figure 7A:
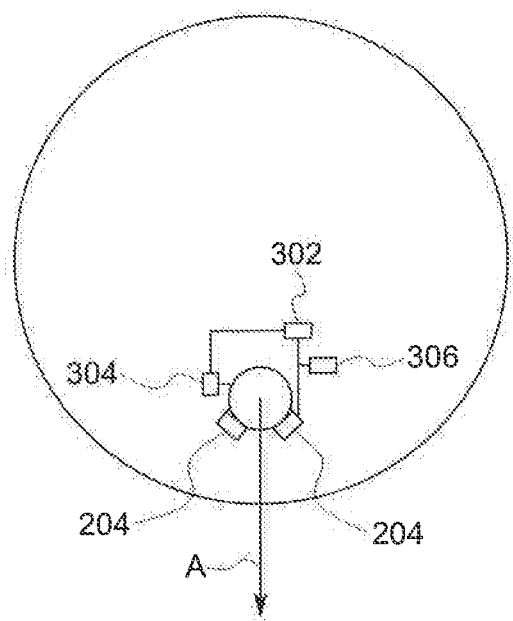
FIGS. 7A-7B are schematic views of further embodiments of a gravitational load reducing mechanism for use in a CT scanner according to still further exemplary embodiments of the invention.
Figure 7B:
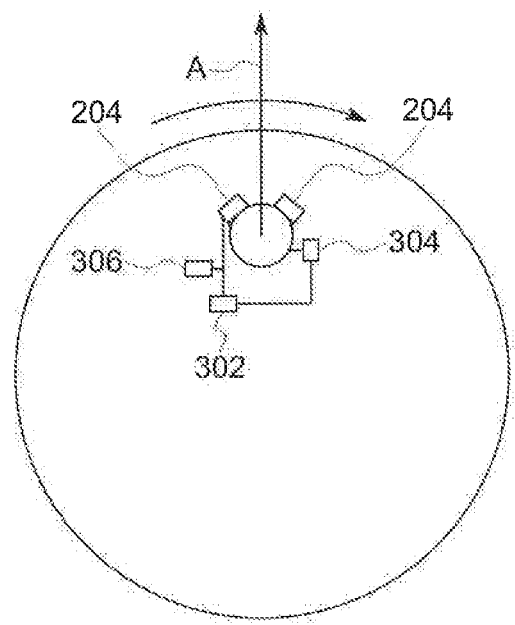

Looking now at FIGS. 7A-7B, in another illustrated exemplary embodiment of the invention, the bearing assembly 50 is schematically illustrated as positioned within a CT scanner 300. In FIG. 7A, the scanner 300 is not in operation, such that only the force of gravity is acting on the rotating sleeve 76 in the direction of arrow A. In this configuration, the load reduction mechanism/magnetic bearing assembly 201, present in any of the various embodiments described previously, is operated generate a magnetic force to reduce or counteract the force of gravity (1 G) acting on the rotating sleeve 76. This enables the rotating sleeve 76 to rotate freely around the shaft 78 with minimal or no interference from the gravitational load on the sleeve 76.

Looking now at FIG. 7B, the CT scanner 300 is in operation and the bearing assembly 50 is rotating around the scanner 300 at a speed of 300 rpm, creating a gravitational load on the rotating sleeve 76 of approximately 80 G acting the direction of arrow A. In this situation, the operation of the load reduction mechanism/magnetic bearing assembly 201 to generate a magnetic force would be adjusted in order to counteract and/or reduce the load on the rotating sleeve 76 to enable the free rotation of the rotating sleeve 76 relative to the shaft 78. This adjustment can be achieved by the load reduction mechanism/magnetic bearing assembly 201 altering the magnetic force(s) exerted by one or more of the magnets 202,204 via a controller 302 is operably connected to the magnet(s) 202 and/or 204. The controller is configured to sense the gravitational load being exerted on the bearing assembly 50, such as via a sensor 304, e.g., an accelerometer, disposed on the bearing assembly 50. Based on the data from the sensor, the controller can supply current from a power source 306 that is operably connected to the magnet(s) 202,204 to increase or decrease the attractive or repulsive force created by the magnet(s) 202, 204 in order to counteract the gravitational load on the bearing assembly 50. The controller can monitor the gravitational load via the sensor in real-time, and thus can correspondingly adjust the counteracting force from the load reduction mechanism/magnetic bearing assembly 201 to effectively counteract the gravitational load and other inertial forces exerted on the rotating sleeve 76 during the operation of the scanner 300 in various modes. Further, the adjustments made by the mechanism 201 can be performed to partially counteract the gravitational forces acting on the bearing assembly 50, such that the rotating component/sleeve 76 can simply rotate freely with regard to the stationary component/shaft 78. In this exemplary embodiment, the sleeve 76 does not to be actively rotated with regard to the shaft 78 as the adjustments of the mechanism 201 and the gravitational loads on the sleeve 76 and bearing assembly 50 will be sufficient to rotate the sleeve 76 relative to the shaft 87, or vice versa.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gravitational load reducing mechanism for an x-ray tube bearing assembly, the load reducing mechanism comprising at least one magnet disposed on one of a rotating component of the bearing assembly or a stationary component of the bearing assembly, wherein the at least one magnet is configured to create a magnetic force in conjunction with another portion of the bearing assembly to reduce the gravitational load of the rotating component relative to the stationary component, wherein the at least one magnet comprises
  a first magnet disposed within the rotating component of the bearing assembly; and
  a second magnet disposed within the stationary component of the bearing assembly, the second magnet spaced from the first magnet to create a magnetic force in conjunction with the first magnet to reduce the load of the rotating component relative to the stationary component, wherein the second magnet is disposed over less than an entire circumference of the rotating component, and wherein the rotating component is a sleeve.

2. The mechanism of claim 1, wherein the first magnet is formed from a plurality of magnets disposed around a circumference of the rotating component.

3. The mechanism of claim 1, wherein the second magnet is disposed on a shaft positioned within the sleeve.

4. The mechanism of claim 1, wherein the second magnet is disposed on a support structure located adjacent the sleeve.

5. The mechanism of claim 1, wherein at least one of the first magnet or the second magnet is formed integrally with the rotating component or the stationary component.

6. The mechanism of claim 1, wherein at least one of the first magnet or the second magnet is a passive magnet.

7. The mechanism of claim 1, wherein the second magnet is an active magnet.

8. The mechanism of claim 1, wherein at least one of the first magnet or the second magnet is adjustably positioned relative to the other portion of the bearing assembly.

9. The mechanism of claim 1, wherein the force generated by at least one of the first magnet or the second magnet is capable of counteracting a gravitational force acting on the rotating member at 1 G.

10. The mechanism of claim 1, wherein the magnetic force is a repulsive force.

11. An x-ray tube comprising:
a cathode assembly; and
an anode assembly spaced from the cathode assembly, wherein the anode assembly comprises;
a rotating component having a first magnet thereon; and
a stationary component having a second magnet thereon, the second magnet spaced from the first magnet to create a magnetic force in conjunction with the first magnet to maintain a position of the rotating component relative to the stationary component against a gravitational load on the rotating component,
wherein the rotating component and the stationary component comprise a journal assembly for the anode assembly, and wherein the journal assembly is a liquid metal bearing assembly.

12. The x-ray tube of claim 11, wherein the second magnet is disposed over less than an entire circumference of the rotating component.

13. The x-ray tube of claim 11, wherein the force generated by the first magnet and the second magnet is capable of counteracting a gravitational force acting on the rotating component at 1 G.

14. A method for maintaining the position of a rotating component relative to a stationary component in a journal assembly of an x-ray tube, the method comprising the steps of:
placing a first magnet on the rotating component;
placing a second magnet on the stationary component, the second magnet spaced from the first magnet to create a magnetic force in conjunction with the first magnet;
wherein the rotating component is a sleeve.

15. The method of claim 14, wherein the step of rotating the rotating component comprises rotating the rotating component at speeds that accelerate or decelerate through speeds under 10 Hz.

16. A method for maintaining the position of a rotating component relative to a stationary component in a journal assembly of an x-ray tube, the method comprising the steps of:
placing a first magnet on the rotating component of the journal assembly, wherein the journal assembly is a liquid metal bearing assembly;
placing a second magnet on the stationary component, the second magnet spaced from the first magnet to create a magnetic force in conjunction with the first magnet; and
adjusting the magnetic force exerted between the first magnet and the second magnet to counteract a gravitational force acting on the rotating member with the magnetic force.

17. The method of claim 16 wherein the step of adjusting the magnetic force comprises altering the magnetic force to enable free rotation of the rotating component relative to the stationary component.

* * * * *